US007190140B2

(12) United States Patent
Yoneda

(10) Patent No.: US 7,190,140 B2
(45) Date of Patent: Mar. 13, 2007

(54) SLIDING MODE CONTROLLER POSITION CONTROL DEVICE

(75) Inventor: Koji Yoneda, Kanagawa (JP)

(73) Assignees: Sodick Co., Ltd., Kanagawa (JP); Sodick America Corporation, San Jose, CA (US)

( * ) Notice: Subject to any disclaimer, the term of this patent is extended or adjusted under 35 U.S.C. 154(b) by 569 days.

(21) Appl. No.: 10/816,864

(22) Filed: Apr. 5, 2004

(65) Prior Publication Data

US 2005/0222695 A1 Oct. 6, 2005

(51) Int. Cl.
*G05B 13/00* (2006.01)

(52) U.S. Cl. ...................... 318/561; 318/560; 318/628; 318/648; 700/28; 700/29

(58) Field of Classification Search ................ 318/560, 318/561, 628; 700/28, 29
See application file for complete search history.

(56) References Cited

U.S. PATENT DOCUMENTS 4,999,553 A * 3/1991 Seraji ......................... 700/245
5,019,958 A * 5/1991 Varga et al. .................. 363/97
5,341,078 A 8/1994 Torii et al.
5,369,345 A 11/1994 Phan
5,379,210 A * 1/1995 Grujic et al. ................. 700/28
5,384,525 A 1/1995 Kato
5,442,270 A * 8/1995 Tetsuaki ................ 318/568.22
5,469,414 A 11/1995 Okamura
5,475,291 A 12/1995 Yoshida et al.
5,489,829 A * 2/1996 Umida ....................... 318/561
5,510,939 A 4/1996 Lewis
5,585,976 A 12/1996 Pham
5,631,999 A 5/1997 Dinsmore
5,847,895 A * 12/1998 Romano et al. ......... 360/78.09
5,880,952 A 3/1999 Yasui et al.
5,929,587 A * 7/1999 Kang ......................... 318/623
5,952,804 A 9/1999 Hamamura et al.
5,982,721 A * 11/1999 Supino et al. ........... 369/44.28
6,046,878 A 4/2000 Liu et al.
6,278,899 B1 * 8/2001 Piche et al. ................... 700/44
6,381,504 B1 * 4/2002 Havener et al. .............. 700/44
6,950,711 B2 * 9/2005 Havener et al. .............. 700/28
2003/0014131 A1 * 1/2003 Havener et al. .............. 700/29
2004/0114270 A1 * 6/2004 Chung et al. ............ 360/78.06

FOREIGN PATENT DOCUMENTS

| | | |
|---|---|---|
| JP | A 2-297603 | 12/1990 |
| JP | A 3-25505 | 2/1991 |
| JP | B2 2999330 | 12/1993 |

* cited by examiner

*Primary Examiner*—Rita Leykin
(74) *Attorney, Agent, or Firm*—McDermott Will & Emery LLP.

(57) ABSTRACT

A position control device for causing a position of a control system, including a servomotor and a moving body driven by the servomotor, to track a command value. The position control device includes a sliding mode controller for receiving command position r and state variable x of the control system and for providing a control input u to the servomotor. State variable x is expressed as follows:

$$x=\begin{bmatrix}\theta\\ \dot{\theta}\end{bmatrix},$$

where $\theta$ is feedback position and $\dot{\theta}$ is feedback velocity. The position control device also includes a disturbance variable compensator for compensating control input u based on feedback velocity $\dot{\theta}$.

12 Claims, 6 Drawing Sheets

SLIDING MODE CONTROLLER POSITION CONTROL DEVICE

FIELD OF THE INVENTION

The present invention relates to a control device for positioning a servomotor or a moving body driven by the servomotor and, in particular relates to a position control device having a sliding mode controller.

DESCRIPTION OF THE RELATED ART

Position control devices for positioning moving bodies such as machine tool bits often include a Proportional-Integral-Derivative ("PID") controller, which is designed based on classic control theory. The position of the moving body, or the position of a servomotor driving the moving body, is detected using a position detector such as a rotary encoder or a linear scale, and the detected position is transmitted to a position control device. The difference between a command position and the detected position is input to a PID controller as an error, and PID controller gain is altered according to this feedback, adjusting servomotor response. Proportional gain can be raised to improve process stability, but if the proportional gain is raised excessively oscillation can occur. Once proportional gain has been lowered to a level where there is no oscillation, system stability can be further improved by altering integral gain.

Another conventional control theory, known as "sliding mode control theory," can be used to design controllers which are simple in design, and have improved controllability characteristics. A sliding mode controller models the state of a control system on a hyperplane by changing gain for determining control input, in accordance with a switching function. Sliding mode control theory has been integrated into control devices for the positioning of moving bodies on machine tools.

FIG. 1 shows one example of a conventional position control device. The position control device includes sliding mode controller 50 for supplying control input u to control system 10, disturbance variable compensator 20 for compensating control input u in response to a disturbance, and state observer 30 for observing state variable x. Control system 10 includes a moving body (not illustrated) and a servomotor (not illustrated), and motor torque constant 11 and transfer function 12. With regard to motor torque constant 11 and transfer function 12, J represents moment of inertia, s represents a Laplacian operator, and Kt represents a torque constant of a motor. An equation of motion for the control system 10 is expressed by Equation (1):

$$J\ddot{\theta}=Kt\cdot Iq-d \tag{1}$$

In Equation (1), θ is the angular position of a servomotor, Iq is q axis current and d is a disturbance value. Based on Equation (1), a state equation representing a function of state variable x, control input u, and controlled variable y can be expressed using the Equation (2).

$$\begin{cases} \dot{x} = A\cdot x + B\cdot u \\ y = C\cdot x \end{cases} \tag{2}$$

$$A = \begin{bmatrix} 1 & 0 \\ 0 & 0 \end{bmatrix}, B = \begin{bmatrix} 0 \\ \frac{Kt}{J} \end{bmatrix}, C = [\,1 \quad 0\,], x = \begin{bmatrix} \theta \\ \dot{\theta} \end{bmatrix}, u = Iq$$

With the above-described servo systems, it is critical to identify and eliminate steady state error. Accordingly, an integral value v of error e between a command position r and a feedback position y which is output from the control system 10 is given to a switching function σ. In this regard, a state equation to expand sliding mode control in a servo system is represented below in Equation (3), and a switching function σ is as shown in Equation (4).

$$\dot{z} = A_s\cdot z + B_s\cdot u + E_s\cdot r + F_s\cdot d \tag{3}$$

$$A_s = \begin{bmatrix} 0 & -C \\ 0 & A \end{bmatrix}, B_s = \begin{bmatrix} 0 \\ B \end{bmatrix}, E_s = \begin{bmatrix} 1 \\ 0 \end{bmatrix}, F_s = [\,0 \quad 1\,]^T, z = \begin{bmatrix} v \\ x \end{bmatrix}$$

$$\dot{v} = e = r - y$$

$$\sigma = S\cdot z \tag{4}$$

$$S = [\,S_1 \quad S_2 \quad S_3\,]$$

The feedback position y is either the measured position θ which is output from the position detector, or an estimated position output from a suitable state observer. The error e, which is the difference between a command position r and a feedback position y, is sent from subtracter 71 to integrator 72. State observer 30 receives both a feedback position y and control input u as inputs, and supplies state variable x to sliding mode controller 50. State variable x and output v from the integrator 72 are input to vectorizer 73, and vectorizer 73 outputs a vector z. The vector z is multiplied by a hyperplane matrix S using multiplier 74.

Design and control of a sliding mode controller 50 is governed by Equation (5):

$$u=u_l+u_{nl} \tag{5}$$

Here, $u_l$ is a linear control input for causing the state of control system 10 to slide on a switching hyperplane, and $u_{nl}$ is a non-linear control input for causing the state of control system 10 to face towards the switching hyperplane. The linear control input $u_l$ is expressed by Equation (6), and the non-linear control input $u_{nl}$ is represented by Equation (7):

$$u_l = -(S\cdot B_s)^{-1}(S\cdot A_s\cdot z + S\cdot E_s\cdot r) \tag{6}$$

$$u_{nl} = -k(S\cdot B_s)^{-1}\frac{\sigma}{|\sigma| + \eta} \tag{7}$$

With regard to machine tools that move at high speeds, typically feed forward compensation of velocity and acceleration is carried out in order to increase tracking during movement. In these specific cases, switching function σ is expressed by Equation (8), and the linear control input $u_l$ is expressed by Equation (9):

$$\sigma=S\cdot z+C_{ff}\cdot r+A_{ff}\cdot\dot{r} \tag{8}$$

$$u_l=-(S\cdot B_s)^{-1}(S\cdot A_s\cdot z+S\cdot E_s\cdot r+C_{ff}\cdot\dot{r}+A_{ff}\cdot\ddot{r}) \tag{9}$$

With the position control device illustrated in FIG. 1, differentiator 46 for differentiating a command position r generates a command velocity ṙ, and a differentiator 47 for differentiating command velocity ṙ generates command acceleration r̈. Feedforward compensator 61 amplifies command velocity r using gain $A_{ff}$, and feedforward compensator 62 amplifies command position r using gain $C_{ff}$. The output S·z of multiplier 74, and the outputs of feedforward compensator 61 and feedforward compensator 62 are supplied to adder 75, and a switching function σ is transmitted from adder 75 to smoothing function 76. Block 77 is input with the output from smoothing function 76, and block 77 sends a non-linear control input $u_{nl}$ to adder 78 based on Equation (7). Feedforward compensator 51 amplifies command acceleration $\ddot{r}$ using gain $A_{ff}$, and feedforward compensator 52 amplifies command velocity $\dot{r}$ using gain $C_{ff}$. Outputs of feedforward compensator 51 and feedforward compensator 52 are respectively transmitted to block 53 and block 54, and command position r and a vector z are respectively transmitted sent to block 55 and block 56. Linear control input $u_l$ is generated as an output of block 53, block 54, block 55 and block 56 based on Equation (9). Adder 78 generates a control input u, namely q axis current Iq, which is the output of sliding mode controller 50. Sliding mode controller 50 controls the state of a control system 10 on a switching hyperplane by altering control input u.

In order for a servomotor to adequately track a commanded input while moving, gain in the sliding mode controller 50 must adjusted to match the parameters of the servo system. If element $S_1$ in block 74, corresponding to gain of an integral value v, is raised, an unwanted overshoot may arise, in response to stepping.

SUMMARY OF THE INVENTION

It is an object of the present invention to address disadvantages found in prior art position control systems, particularly with regard to those disadvantages which relate to the prevention of overshoot, without impairing tracking during movement.

According to the present invention, a position control device for causing a position of a control system, including a servomotor and a moving body driven by the servomotor, to track a command value, includes a sliding mode controller for receiving a command position and state variables of the control system, according to Equation (10), and for providing a control input to the servomotor.

$$x = \begin{bmatrix} \theta \\ \dot{\theta} \end{bmatrix} \tag{10}$$

In Equation (10), θ is a feedback position and $\dot{\theta}$ is feedback velocity. The position control device also includes a disturbance variable compensator for compensating control input based on feedback velocity $\dot{\theta}$, where with a hyperplane matrix S as $[S_2\ S_3]$, a switching function σ in the sliding mode controller contains S·x.

The sliding mode controller is preferably input with command velocity $\dot{r}$ and command acceleration $\ddot{r}$, and with $C_{ff}$ and $A_{ff}$ as gain. The switching function σ is expressed in Equation (11).

$$\sigma = S \cdot x + C_{ff} \cdot \dot{r} + A_{ff} \cdot \ddot{r} \tag{11}$$

Control input u is the sum of linear control input $u_l$ and non-linear control input $u_{nl}$, where the linear control input $u_l$ is expressed in Equation (12):

$$u_l = -(S \cdot B)^{-1}(S \cdot A \cdot x + C_{ff} \cdot \dot{r} + A_{ff} \cdot \ddot{r}) \tag{12}$$

$$A = \begin{bmatrix} 1 & 0 \\ 0 & 0 \end{bmatrix}, B = \begin{bmatrix} 0 \\ \frac{Kt}{J} \end{bmatrix}, C = [\,1 \quad 0\,], u = Iq$$

In a second aspect, the present invention is a position control device for causing a position of a control system, including a servomotor and a moving body driven by the servomotor, to track a command value. The position control device comprises a sliding mode controller for receiving command position r and state variable x of the control system and providing a control input u to the servomotor without using integrating elements, wherein state variable x is expressed in Equation (10), wherein θ is feedback position and $\dot{\theta}$ is feedback velocity. The position control device further includes a disturbance variable compensator for compensating control input u based on feedback velocity $\dot{\theta}$.

This brief summary has been provided so that the nature of the invention may be understood quickly. A more complete understanding of the invention can be obtained by reference to the following detailed description of the preferred embodiments thereof in connection with the attached drawings. It is to be understood that other embodiments may be utilized and changes may be made without departing from the scope of the present invention.

DETAILED DESCRIPTION OF THE INVENTION

Figure 2:
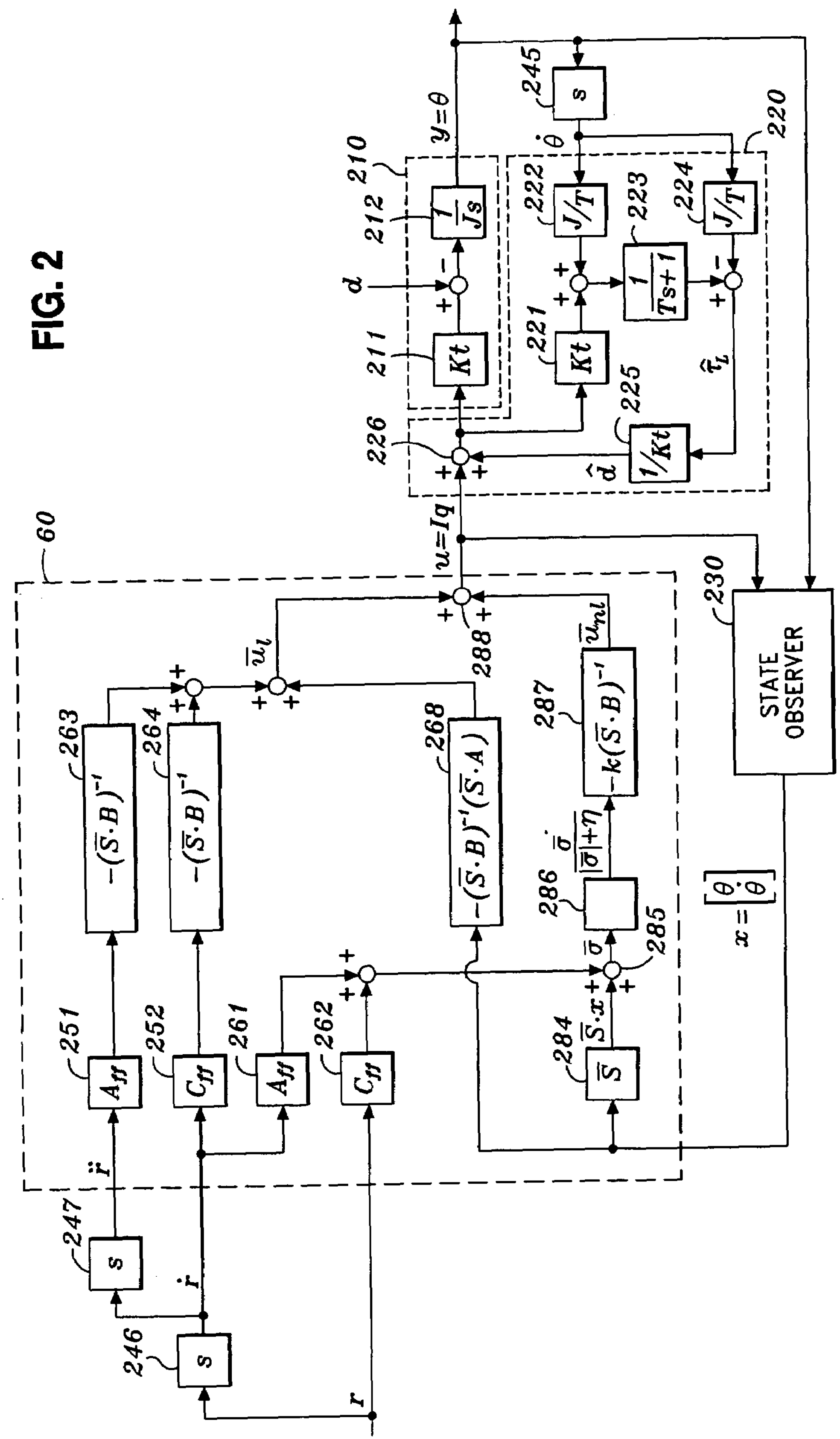
FIG. 2 is a block diagram of one example of a position control device according to the present invention.

FIG. 2 illustrates one example of a position control device according to the present invention. The position control device includes a sliding mode controller for supplying control input u to a control system, a disturbance variable compensator for compensating control input u in response to a disturbance, and a state observer for observing state variable x.

Sliding mode controller 260 does not include any integrating elements. Within the sliding mode controller 260, an integral value of an error between command position r and feedback position y is not supplied to a switching function. A disturbance variable compensator 220 compensates with the entire error as disturbance. The switching function is expressed as follows.

$$\overline{\sigma} = \overline{S} \cdot x \tag{13}$$

$$\overline{S} = [\,S_2 \quad S_3\,], x = \begin{bmatrix} \theta \\ \dot{\theta} \end{bmatrix}$$

The switching function and hyperplane matrix in Equation (13) are represented using $\bar{\sigma}$ and $\bar{S}$ in order to differentiate them from those in Equation (4). State observer 230 receives a feedback position y and control input u as inputs, and supplies state variable x to the sliding mode controller 260. The state variable x is multiplied by a hyperplane matrix $\bar{S}$ using multiplier 284.

Design of sliding mode controller 260 is also governed by the Equation (5). The linear and non-linear control inputs are respectively expressed by Equations (14) and (15).

$$\bar{u}_l = -(\bar{S}\cdot B)^{-1}(\bar{S}\cdot A\cdot x) \tag{14}$$

$$\bar{u}_{nl} = -k(\bar{S}\cdot B)^{-1}\frac{\bar{\sigma}}{|\bar{\sigma}|+\eta} \tag{15}$$

The linear and non-linear control inputs of Equations (14) and (15) are represented using $\bar{u}_l$ and $\bar{u}_{nl}$ in order to differentiate them from those in Equations (6) and (7). To increase tracking during movement using feedforward compensation of velocity and acceleration, Equations (13) and (14) are expressed by Equations (16) and (17), respectively.

$$\bar{\sigma}=\bar{S}\cdot x+C_{ff}\cdot r+A_{ff}\cdot\dot{r} \tag{16}$$

$$\bar{u}_l=-(\bar{S}\cdot B)^{-1}(\bar{S}\cdot A\cdot x+C_{ff}\cdot\dot{r}+A_{ff}\cdot\ddot{r}) \tag{17}$$

Command position r from a numerical control device (not shown) is supplied to block 262. Command velocity $\dot{r}$ is sent to feedforward compensator 252 and feedforward compensator 261, and command acceleration $\ddot{r}$ is sent to feedforward compensator 251. Output $\bar{S}\cdot x$ of multiplier 284, and the outputs of feedforward compensator 261 and feedforward compensator 262 are supplied to adder 285, and a switching function $\bar{\sigma}$ is sent from adder 285 to smoothing function 286. Block 287 is input with the smoothing function 286 output, and block 287 sends a non-linear control input $\bar{u}_{nl}$ to adder 288 based on Equation (15). The output of feedforward compensator 251 and feedforward compensator 252 are respectively transmitted to block 263 and block 264, and state variable x is sent to block 268. Linear control input $\bar{u}_1$ is obtained from outputs of block 263, block 264, and block 268 based on Equation (17). Adder 288 generates a control input u, namely q axis current Iq, as an output of sliding mode controller 260. Sliding mode controller 260 restrains the state of control system 210 on a switching hyperplane by switching of control input u.

Control input u, namely q axis current Iq, and feedback velocity are supplied to disturbance variable compensator 220, and disturbance variable compensator 220 compensates control output u in response to disturbance torque. Q axis current Iq is multiplied by torque constant Kt in multiplier 221. A feedback velocity is a measured velocity $\dot{\theta}$, or an estimated velocity is output from a suitable state observer. A differentiator 245 for differentiating measured position θ outputs measured velocity $\dot{\theta}$, and this measured velocity $\dot{\theta}$ is multiplied by J/T inside multiplier 222 and multiplier 224, where T represents a time constant of the low pass filter 223. The sum of the outputs of the multiplier 221 and multiplier 222 is supplied to the low pass filter 223, where s represents a Laplacian operator. Estimated disturbance torque $\hat{\tau}_L$ is obtained by subtracting the output of multiplier 224 from the output of the low pass filter 223. Multiplier 225 multiplies estimated disturbance torque $\hat{\tau}_L$ by 1/Kt, and generates estimated disturbance $\hat{d}$ having estimated disturbance torque $\hat{\tau}_L$ converted to q axis current. Adder 226 supplies a sum of control output u and estimated disturbance $\hat{d}$ to control system 210.

Figure 3A:
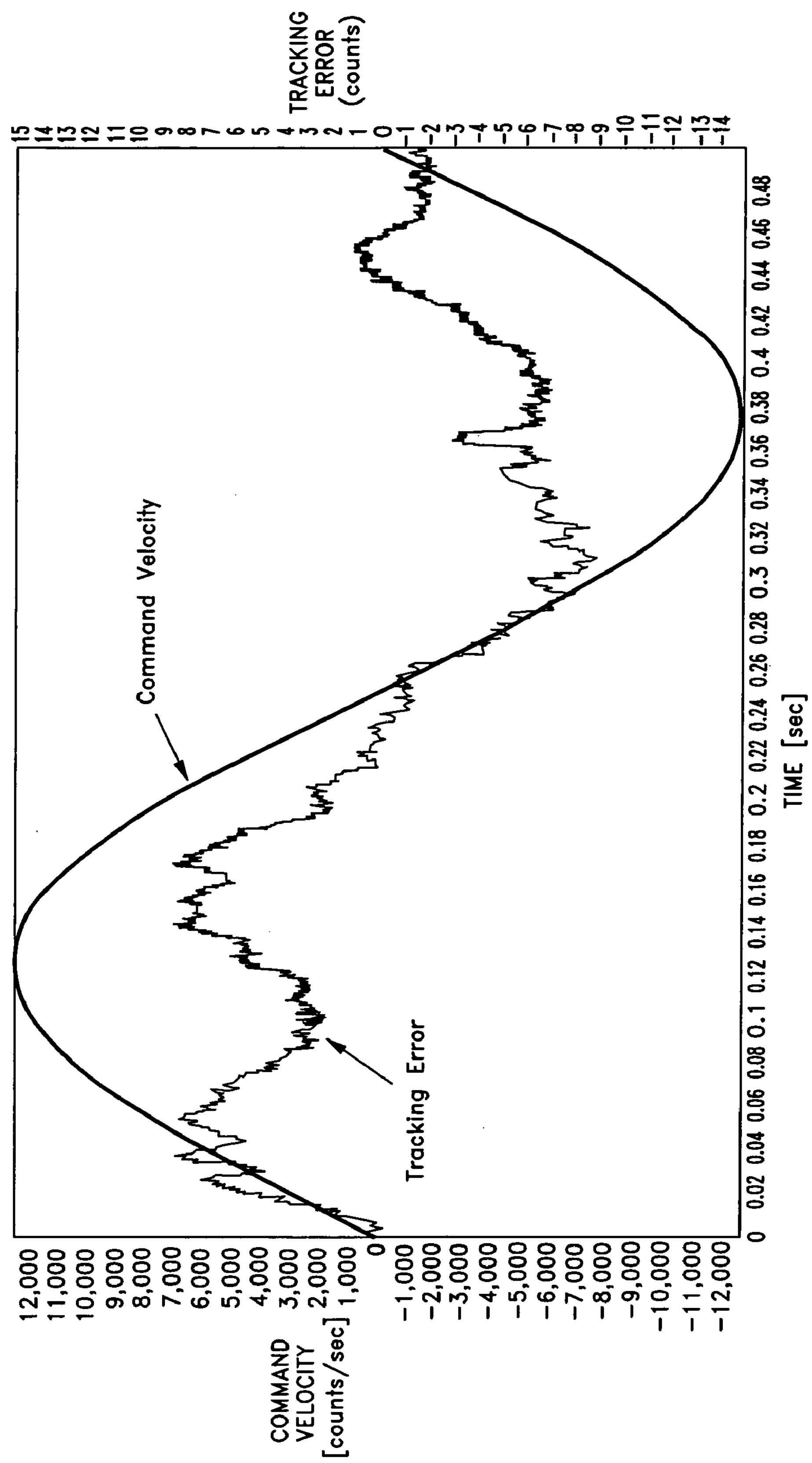
FIGS. 3A & 3B are graphs illustrating plotting tracking error and step response, using the FIG. 2 position control device.
Figure 3B:
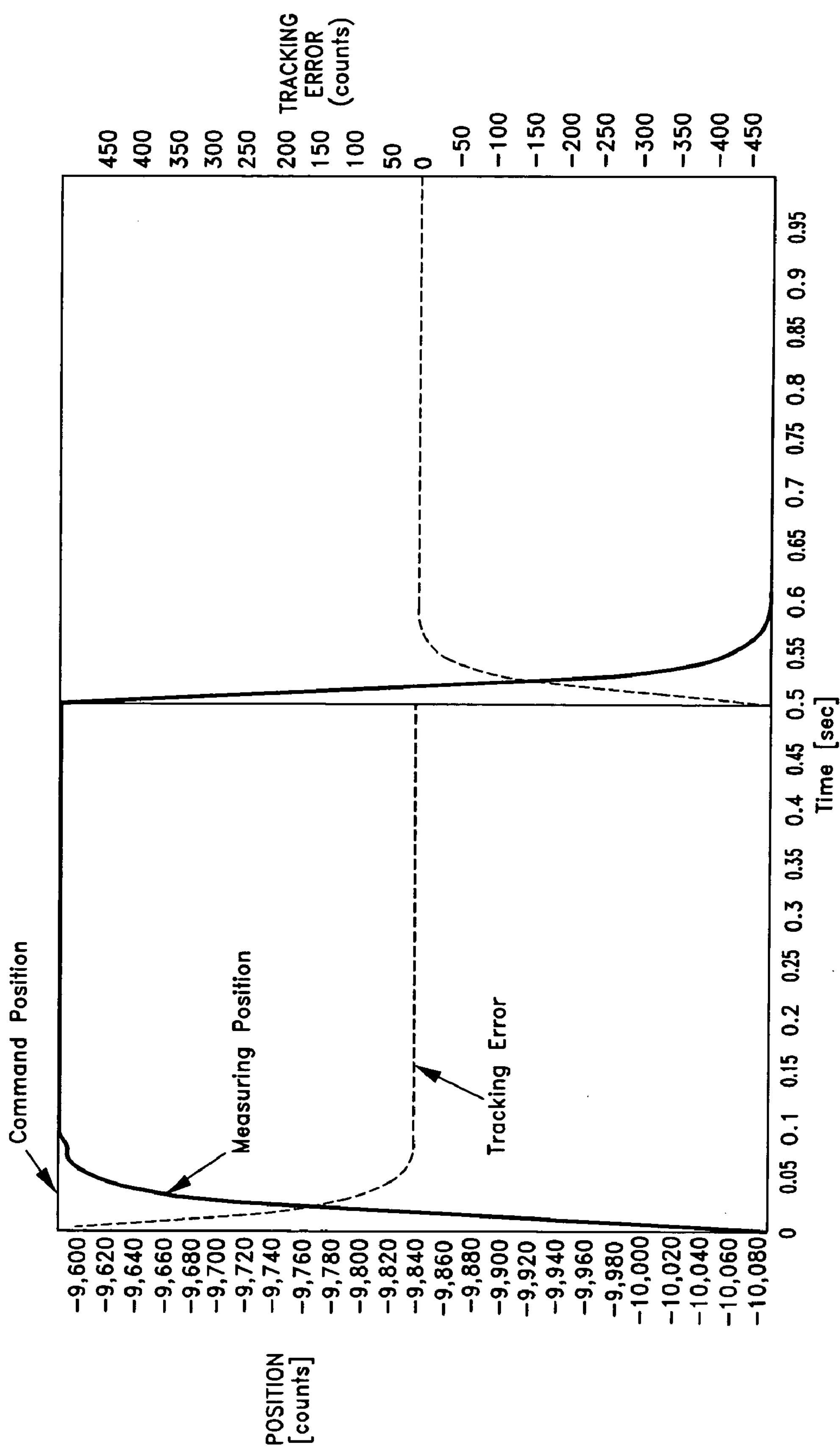

As shown in FIG. 3A, gains in the position control device of FIG. 2 have been adjusted so that maximum tracking error is less than 10 counts, and the graph of FIG. 3B shows step response measured in such a state.

Figure 1:
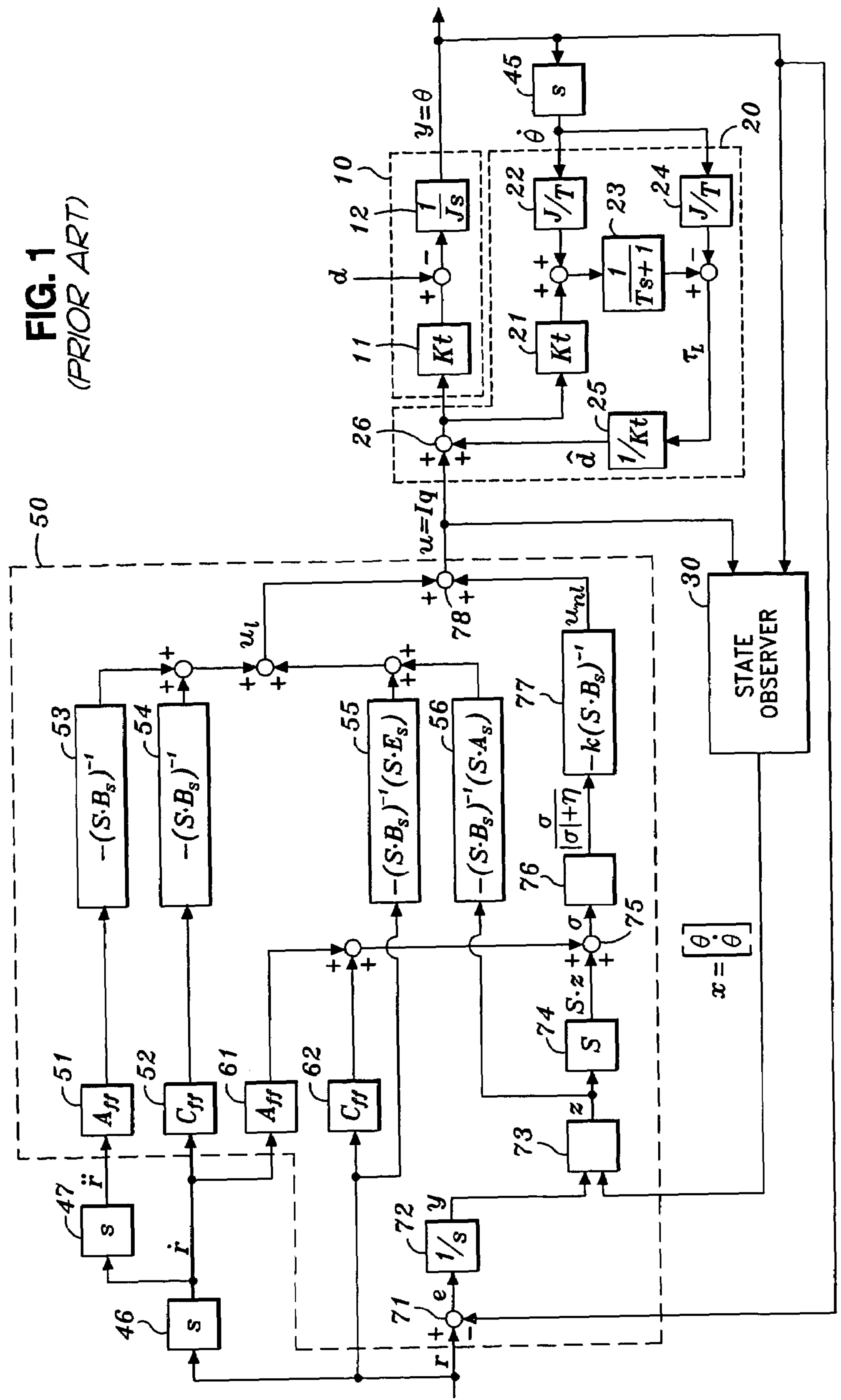
FIG. 1 is a block diagram of a conventional position control device.
Figure 4A:
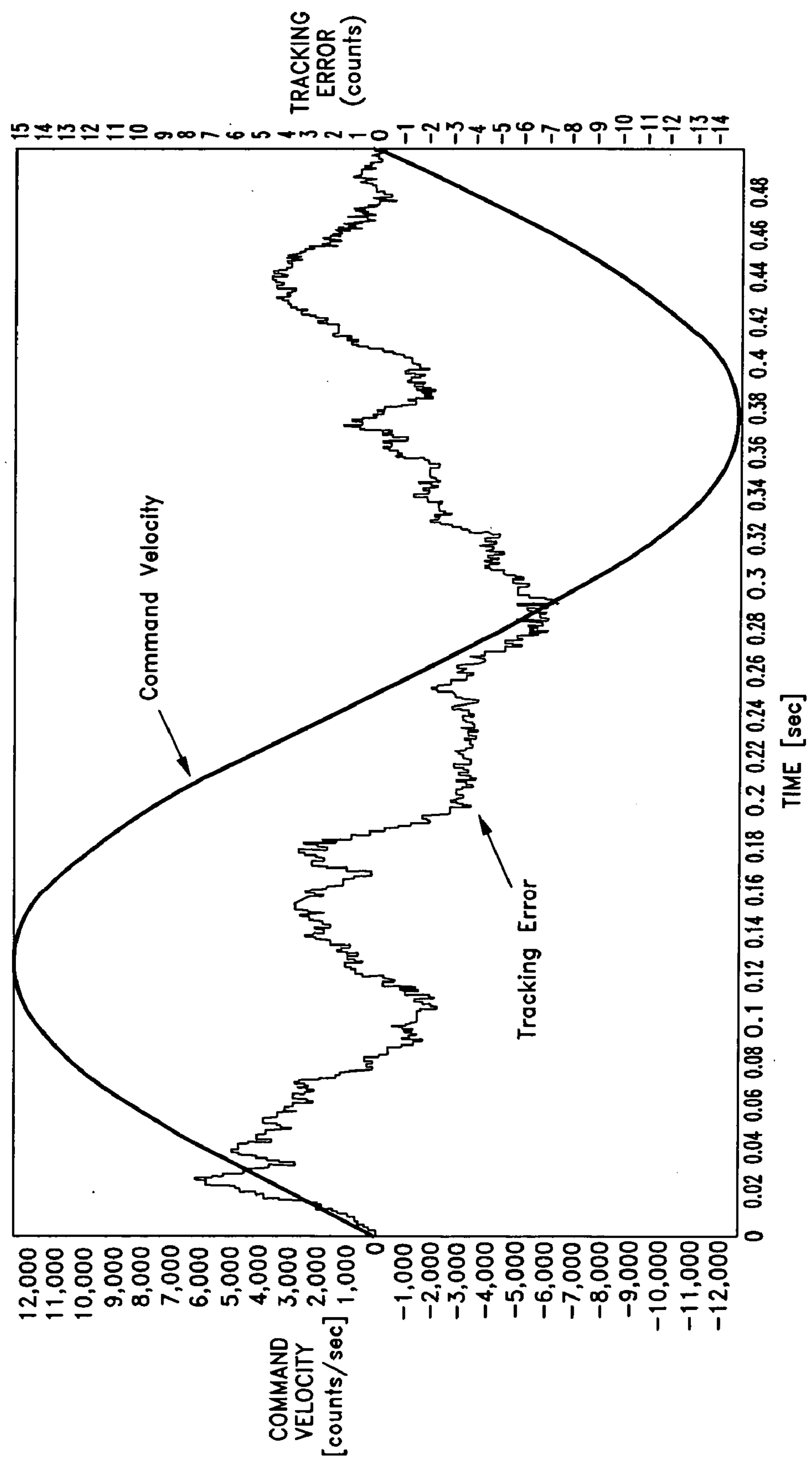
FIGS. 4A & 4B are graphs illustrating plotting tracking error and step response, using the conventional position control device depicted in FIG. 1.
Figure 4B:
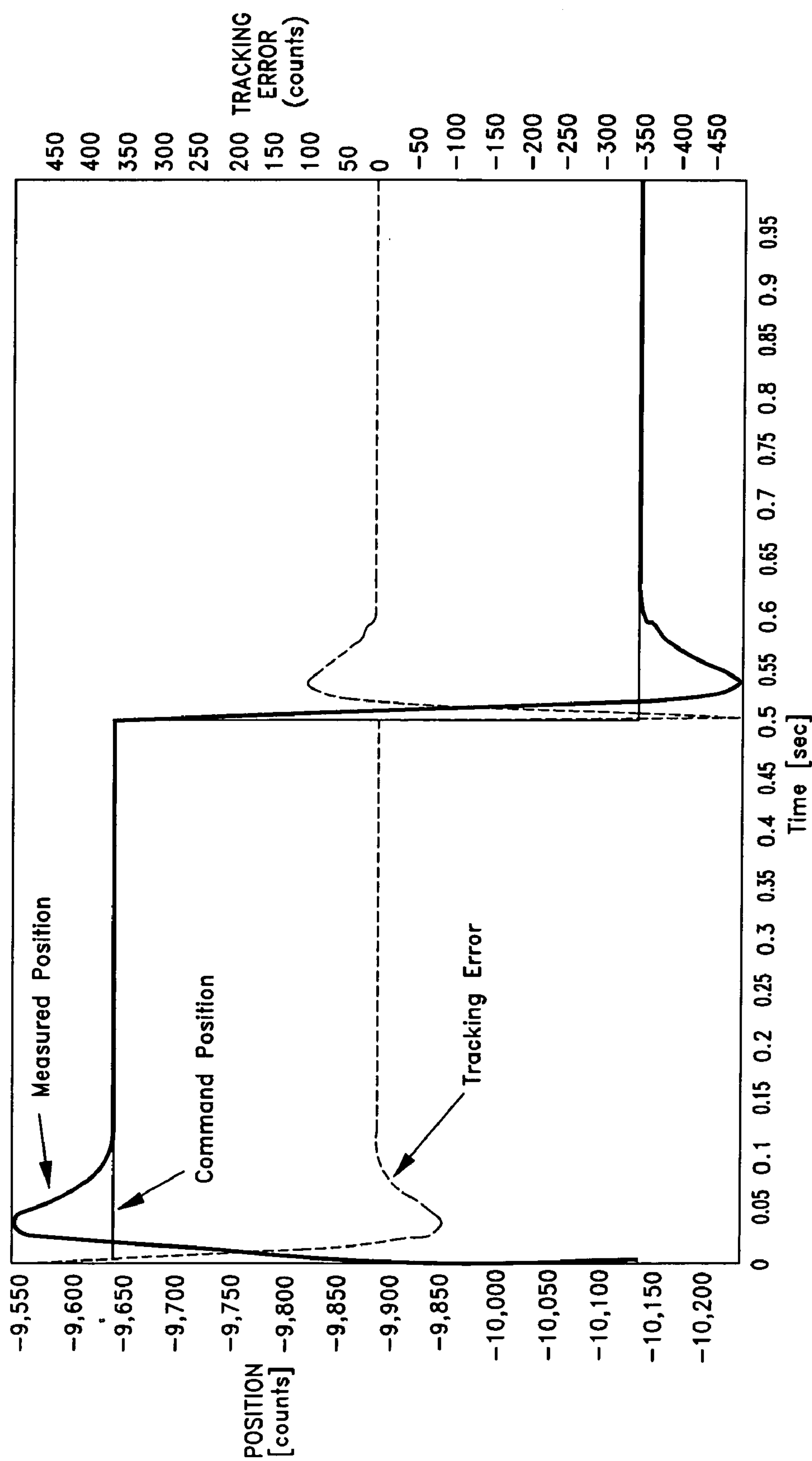

As shown in FIG. 4A, gains in the position control device of FIG. 1 also have been adjusted so that maximum tracking error is less than 10 counts. The graph of FIG. 4B shows step response measured in this state, indicating an undesirable overshoot. As shown in FIG. 3B, the position control device of the present invention can prevent the occurrence of overshoot in a state where tracking error is small.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A position control device for causing a position of a control system, including a servomotor and a moving body driven by the servomotor, to track a command value, the position control device comprising:

a sliding mode controller for receiving command position r and state variable x of the control system and for providing a control input u to the servomotor, wherein state variable x is expressed as follows:

$$x=\begin{bmatrix}\theta\\ \dot{\theta}\end{bmatrix},$$

wherein θ is feedback position and $\dot{\theta}$ is feedback velocity; and a disturbance variable compensator for compensating control input u based on feedback velocity $\dot{\theta}$, wherein with a hyperplane matrix S as $[S_2\ S_3]$, a switching function σ in the sliding mode controller contains S·x.

2. The position control device according to claim 1, wherein the control input u to the servomotor is a q axis current Iq.

3. The position control device according to claim 1, wherein an equation of state for the control system is expressed as follows:

$$\begin{cases}\dot{x}=A\cdot x+B\cdot u\\ y=C\cdot x\end{cases}$$

$$A=\begin{bmatrix}1 & 0\\ 0 & 0\end{bmatrix},\ B=\begin{bmatrix}0\\ \frac{Kt}{J}\end{bmatrix},\ C=[1\ \ 0],\ x=\begin{bmatrix}\theta\\ \dot{\theta}\end{bmatrix},\ u=Iq,$$

wherein J represents a moment of inertia and Kt represents a torque constant of the servomotor.

4. The position control device according to claim 3, wherein an equation of motion for the control system is expressed as follows:

$$J\ddot{\theta}=Kt\cdot Iq-d.$$

5. The position control device according to claim 3, wherein said sliding mode controller is input with command velocity $\dot{r}$ and command acceleration $\ddot{r}$, and with $C_{ff}$ and $A_{ff}$ as gain, wherein the switching function σ is expressed as follows:

$$\sigma = S \cdot x + C_{ff} \cdot r + A_{ff} \cdot \dot{r},$$

wherein the control input u is the sum of linear control input $u_l$ and non-linear control input $u_{nl}$, and wherein the linear control input $u_l$ is expressed as follows:

$$u_l = -(S \cdot B)^{-1}(S \cdot A \cdot x + C_{ff} \cdot \dot{r} + A_{ff} \cdot \ddot{r}).$$

6. The position control device according to claim 5, wherein non-linear control input $u_{nl}$ is expressed as follows:

$$\overline{u}_{nl} = -k(\overline{S} \cdot B)^{-1} \frac{\overline{\sigma}}{|\overline{\sigma}| + \eta}.$$

7. A position control device for causing a position of a control system, including a servomotor and a moving body driven by the servomotor, to track a command value, the position control device comprising:

a sliding mode controller for receiving command position r and state variable x of the control system and providing a control input u to the servomotor without using integrating elements, wherein state variable x is expressed as follows:

$$x = \begin{bmatrix} \theta \\ \dot{\theta} \end{bmatrix}$$

wherein θ is feedback position and $\dot{\theta}$ is feedback velocity; and a disturbance variable compensator for compensating control input u based on feedback velocity $\dot{\theta}$.

8. The position control device according to claim 7, wherein the control input u to the servomotor is a q axis current Iq.

9. The position control device according to claim 7, wherein an equation of state for the control system is expressed as follows:

$$\begin{cases} \dot{x} = A \cdot x + B \cdot u \\ y = C \cdot x \end{cases}$$

$$A = \begin{bmatrix} 1 & 0 \\ 0 & 0 \end{bmatrix}, B = \begin{bmatrix} 0 \\ \frac{Kt}{J} \end{bmatrix}, C = [\,1 \quad 0\,], x = \begin{bmatrix} \theta \\ \dot{\theta} \end{bmatrix}, u = Iq,$$

wherein J represents moment of inertia and Kt represents a torque constant of the servomotor.

10. The position control device according to claim 9, wherein an equation of motion for the control system is expressed as follows:

$$J\ddot{\theta} = Kt \cdot Iq - d.$$

11. The position control device according to claim 9, wherein the sliding mode controller is input with command velocity $\dot{r}$ and command acceleration $\ddot{r}$, and with $C_{ff}$ and $A_{ff}$ as gain, wherein the switching function σ is expressed as follows:

$$\sigma = S \cdot x + C_{ff} \cdot r + A_{ff} \cdot \dot{r}$$

$$S = [S_2\ S_3],$$

wherein the control input u is the sum of linear control input $u_l$ and non-linear control input $u_{nl}$, and wherein the linear control input $u_l$ is expressed as follows:

$$u_l = -(S \cdot B)^{-1}(S \cdot A \cdot x + C_{ff} \cdot \dot{r} + A_{ff} \cdot \ddot{r}).$$

12. The position control device according to claim 11, wherein non-linear control input $u_{nl}$ is expressed as follows:

$$\overline{u}_{nl} = -k(\overline{S} \cdot B)^{-1} \frac{\overline{\sigma}}{|\overline{\sigma}| + \eta}.$$

* * * * *